United States Patent [19]
Alarcon-Lopez et al.

[11] Patent Number: 5,620,293
[45] Date of Patent: Apr. 15, 1997

[54] GLASS SHEET HANDLING APPARATUS

[75] Inventors: Manuel Alarcon-Lopez, Col. Bondojito; Rafael-Jorge Rojas-Cortes, Col. El Dorado; Oscar Lugo-Ramirez, Fraccionamiento IMMEX Tultitlán; Severino Islas-Sanchez, Ojo de Agua; Enrique-Meliton Gomez-Hernandez, Col. Lazaro Cárdenas, all of Mexico

[73] Assignee: Vidrio Plano De Mexico, San Juan Ixhuatepec, Mexico

[21] Appl. No.: 511,652

[22] Filed: Aug. 7, 1995

[51] Int. Cl.⁶ .................................... B65H 29/44
[52] U.S. Cl. .................... 414/399; 414/799; 414/798.5
[58] Field of Search ........................ 414/399, 390, 414/391, 392, 396, 331, 401, 398, 798.2, 798.5, 798.9, 922, 799, 923; 271/184, 306, 3.12

[56] References Cited

U.S. PATENT DOCUMENTS

| | | | |
|---|---|---|---|
| 3,410,425 | 11/1968 | Guillaume | 414/798.5 |
| 3,934,871 | 1/1976 | Dean | 414/799 X |
| 4,093,083 | 6/1978 | Klaus | 414/798.5 X |

FOREIGN PATENT DOCUMENTS

| | | | |
|---|---|---|---|
| 2003294 | 5/1990 | Canada | 414/798.5 |
| 3928850 | 3/1991 | Germany | 414/798.5 |
| 4139887 | 6/1993 | Germany | 414/798.5 |
| 4211317 | 10/1993 | Germany | 414/798.5 |
| 183528 | 10/1983 | Japan | 414/798.5 |
| 128817 | 5/1991 | Japan | 414/798.5 |
| 706299 | 1/1980 | U.S.S.R. | 414/798.5 |

*Primary Examiner*—Frank E. Werner
*Attorney, Agent, or Firm*—Abelman, Frayne & Schwab

[57] ABSTRACT

A glass sheet handling apparatus for horizontally receiving a glass sheet from a roller conveyor and placing the sheet vertically on a pyramidal conveying shelf comprising a discharging platform at the end of the conveyor to receive a glass sheet; an angular member having a first end pivotally joined to the platform and a second end pivotally anchored to a support structure; a fluid operated cylinder and piston assembly having its cylinder pivotally anchored to the support structure and its piston pivotally joined the angular member; and a controller to control the operation of the fluid operated cylinder and piston assembly, so that when the piston is actuated, it lifts the angular arm and the discharging platform with the glass sheet thereon, from a horizontal position through a path defining an arc to a vertical position, thereby vertically positioning the glass sheet on the pyramidal conveying shelf. Alternatively, a motor-driven rack and pinion or other mechanical devices can be used to lift the angular member.

7 Claims, 5 Drawing Sheets

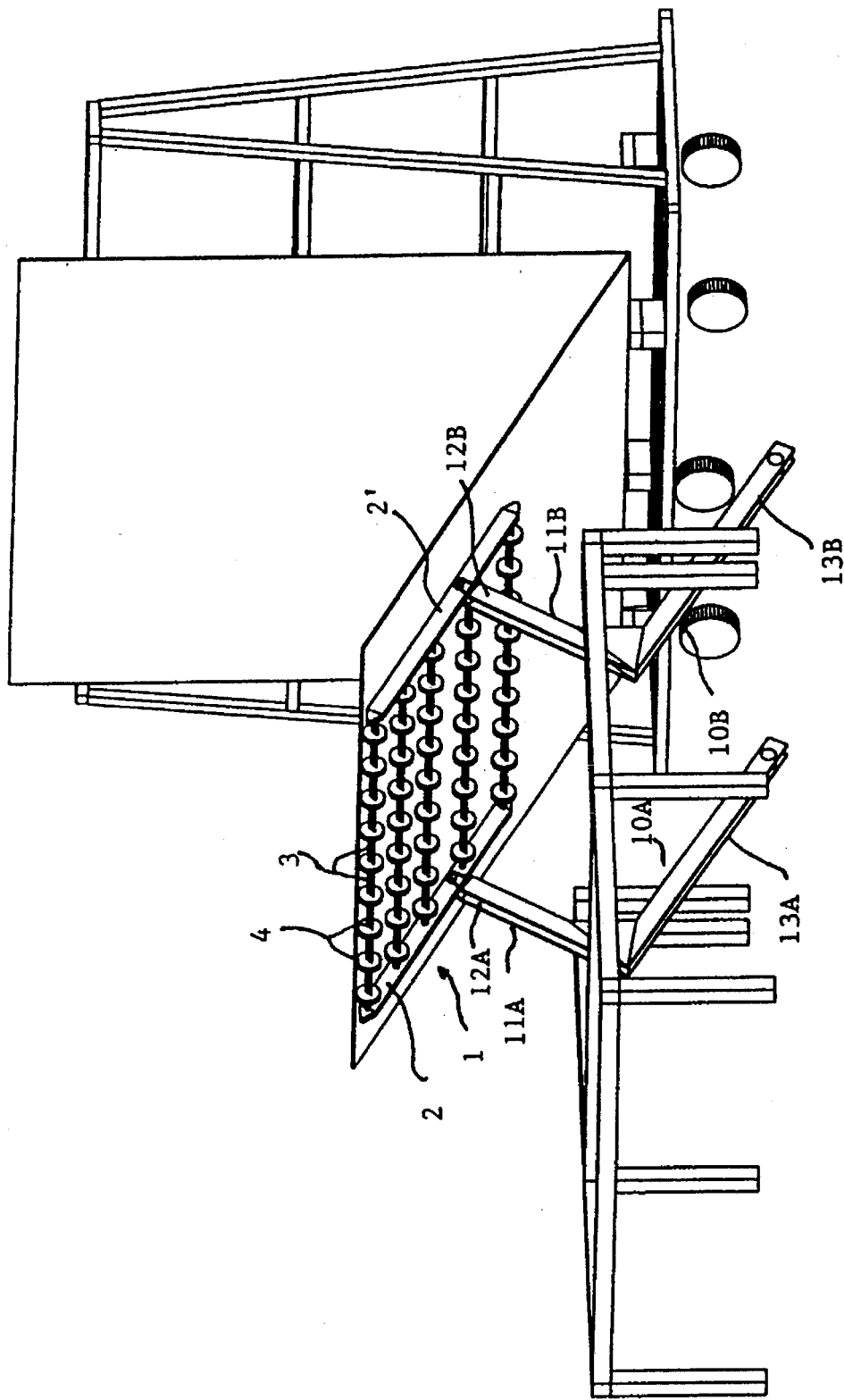

GLASS SHEET HANDLING APPARATUS

BACKGROUND OF THE INVENTION

A. Field of the Invention

This invention refers to a glass sheet handling apparatus and more specifically, to a glass sheet handling apparatus to horizontally receive a glass sheet from a conveyor and place it vertically on a pyramidal conveying shelf.

B. Description of the Previous Art

Discharging of horizontal glass sheets or plates from the roller driven conveyor of a production line, to load a predetermined number of them first on one side of a pyramidal conveying shelf and then on the other side thereof when the shelf rotates on the rotary platform, was previously manually performed by operators.

The procedure comprised a plurality of couples of operators each of them holding the front end of a horizontal glass sheet from the conveyor, placing it on the cushioning pad of a pyramidal conveying shelf, lifting the rear end thereof and pushing it to overcome a vertical position to be overloaded on a first wall (tilted about 120° regarding the horizontal line) of the shelf, repeating the operation to load a plurality of glass sheets on said first wall of the shelf and then on the second opposite wall thereof by rotating the conveying shelf 180°.

Although simple, the most heavy and risky procedure for the operators and for the glass sheet, mainly for long glass sheets, is the step of lifting the rear end of the glass sheet because it is necessary that the operators, with a great effort, push up the glass sheet at a height greater than their own, supporting the most part of the weight of the glass sheet.

Furthermore, in a continuous and progressively faster production line, such a time consuming discharging .procedure presents serious limitations and risks for the operators, for the product and for the velocity of production.

Therefore it was highly desirable to have an automatic discharging apparatus with which it is only necessary, if any, that the operators receive the glass sheets from the conveyor and place its front end on the cushioning pad of the pyramidal conveying shelf, so that the apparatus push up the glass sheet at an angle enough to be overloaded on a tilted wall of the shelf.

As disclosed herein, applicants conceived an automatic glass sheet handling apparatus comprising: a discharging platform at the end of the sheet conveyor, to receive a glass sheet; a jointed angular member having a first end coupled to the platform and a second end pivotal anchored on a support structure; a fluid operated motor pivotal anchored on the support structure and having its piston pivotal coupled to the angular member; and a controller to control the operation of the fluid operated motor, so that when the piston is actuated, lifts the angular member with the platform carrying a glass sheet thereon, from a horizontal or tilted position to a vertical position, at an angle lightly greater than 90° (usually 120°) placing it on a tilted wall of a pyramidal conveying shelf.

SUMMARY OF THE INVENTION

It is therefore a main object of the present invention, to provide a glass sheet handling apparatus to automatically discharge consecutive glass sheets from a line of production and load them on a pyramidal conveying shelf.

It is also a main object of the present invention, to provide a glass sheet handling apparatus to horizontally receive a glass sheet from a conveyor and automatically place it vertically, at an angle enough to be loaded on a pyramidal conveying shelf.

It is still a main object of the present invention, to provide a glass sheet handling apparatus to automatically discharge consecutive glass sheet from a line of production and load them on a pyramidal conveying shelf substantially reducing operator risks, reducing operation time and increasing the velocity and efficiency of the discharging operation.

These and other objects and advantages of the apparatus of the present invention, will be apparent to the persons having standard skill in the art, form the following detailed description of the preferred embodiments thereof.

BRIEF DESCRIPTION OF THE DRAWINGS

FIGS. 2 and 2A are schematic views of the glass sheet handling apparatus shown in FIG. 1, in operation;

DETAILED DESCRIPTION OF THE INVENTION

Figure 1:
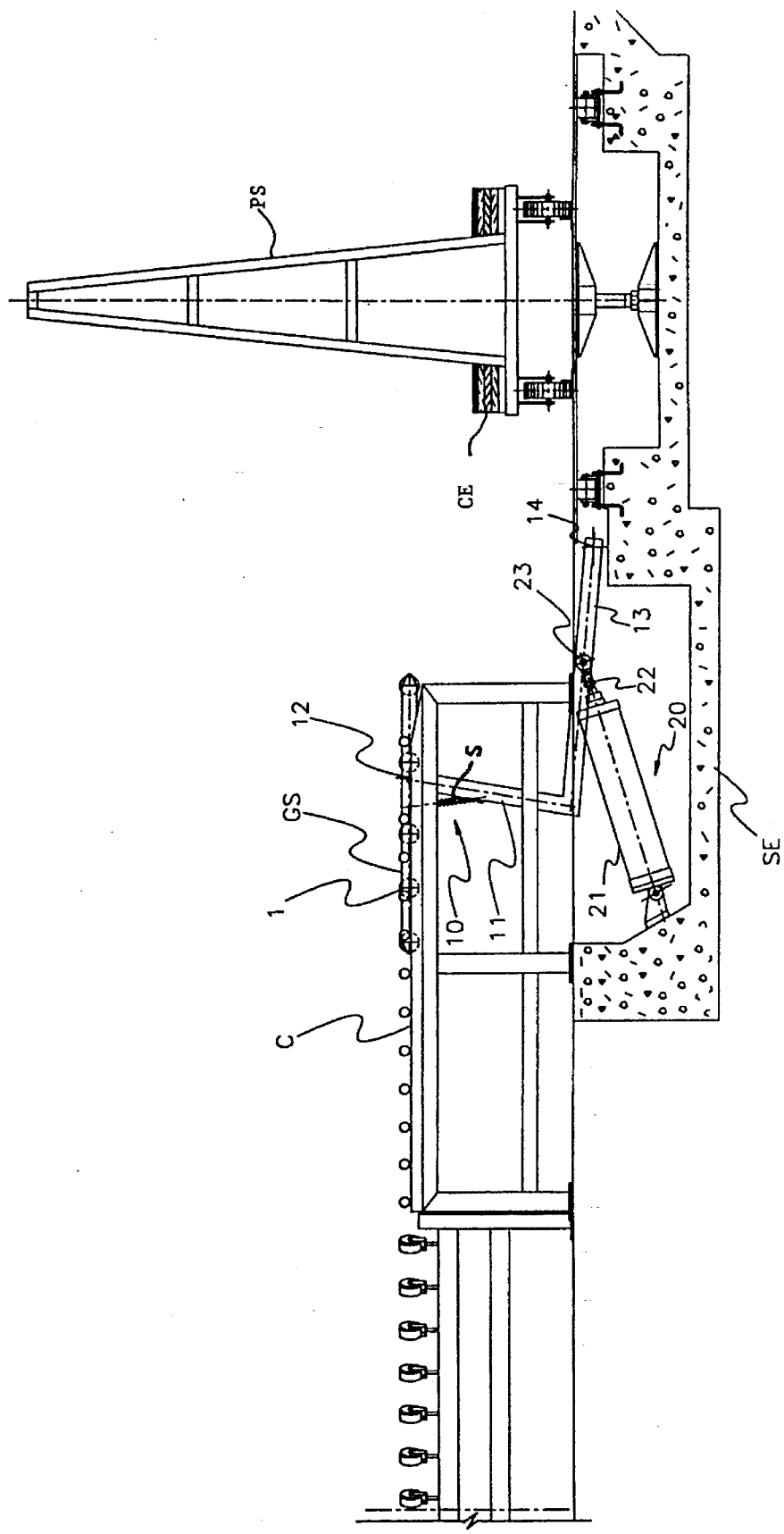
FIG. 1 is a lateral view of an embodiment of the glass sheet handling apparatus in accordance with the present invention, showing its constitutive components.
Figure 3:
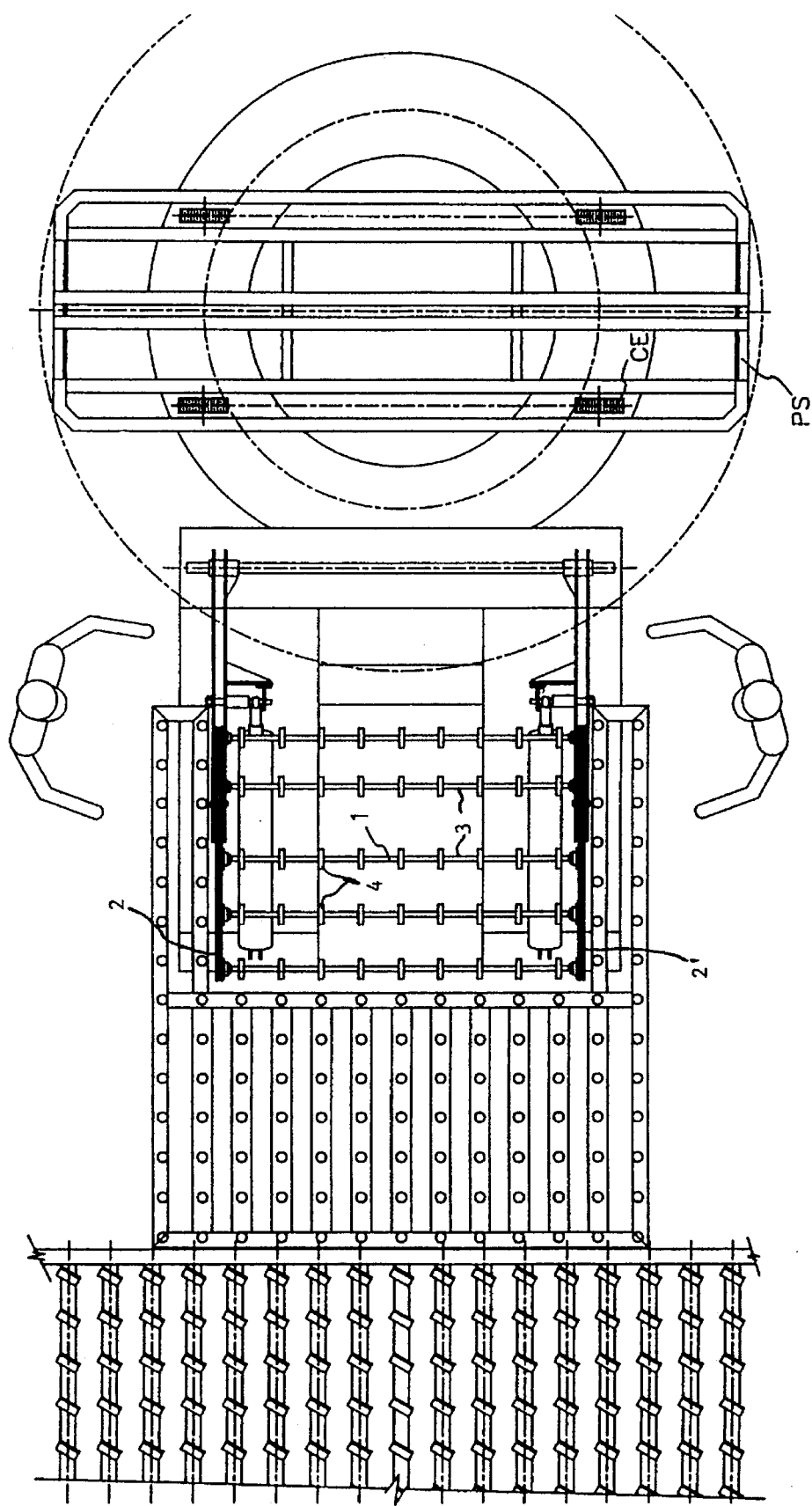
FIG. 3 is a plan view of the glass sheet handling apparatus illustrated in FIG. 1.
Figure 4:
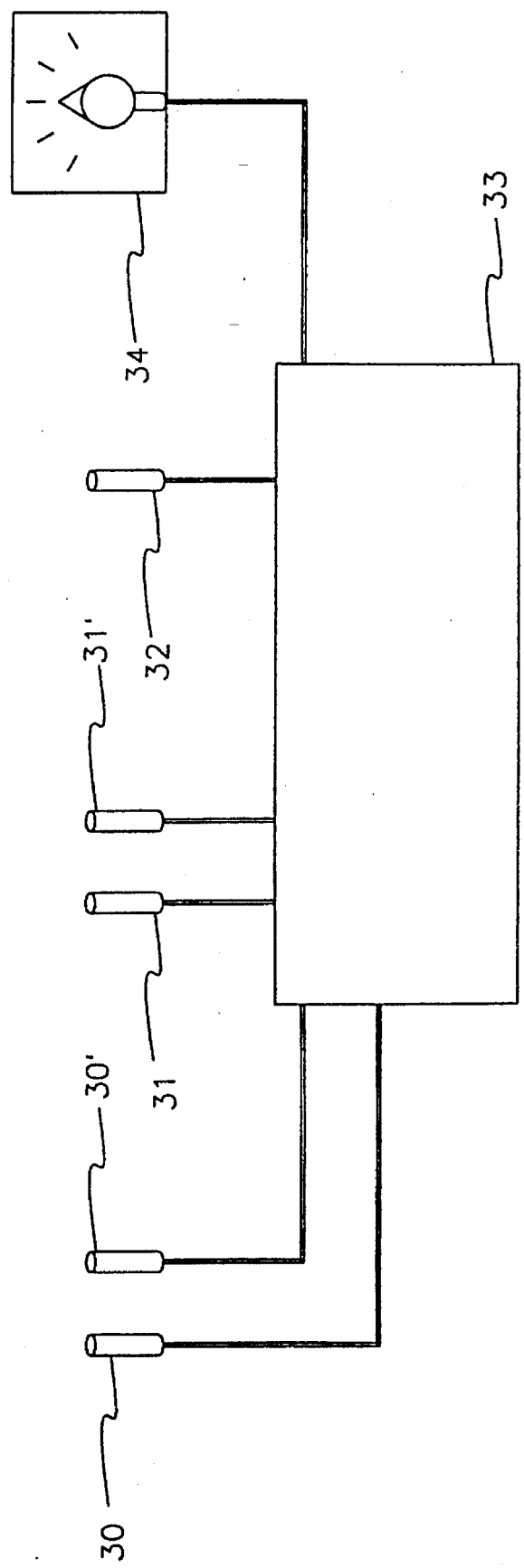
FIG. 4, is a block diagram of the control system for the automatic synchronization of the glass sheet discharging apparatus.

Referring mainly to FIG. 1 of the drawings the glass sheet handling apparatus to horizontally receive a glass sheet from a roller conveyor and place it vertically on a conveying shelf, in accordance with the present invention, comprising:

glass sheet receiving means, such as a platform 1, placed at a discharging end of an horizontal roller conveyor C, to receive a glass sheet GS to be discharged from a line of production;

reciprocate lifting means, such as a hinged angular member 10 including a support member 11 having its free end 12 coupled to a portion of the platform 1 and an operating member 13 at 90° to the support member 11, having its free end 14 pivotally coupled to a support structure SE;

driving means, such as a fluid operated motor 20, having its cylinder 21 pivotal anchored on the support structure SE and having an end 23 of its piston rod 22 pivotally coupled to an intermediate portion of the operating member 13 of the hinged angular member 10; and control means (FIG. 4) to control the operation of the driving means, comprising a first sensor 30, preferably placed immediately at the arriving end of a glass sheet to a first conveyor (FIG. 3), providing a signal indicating the presence of a glass sheet on the first conveyor, and provide a signal to actuate the system for changing the direction of the glass sheet; a second sensor 31 at the end of a linear conveyor providing a signal the presence of a glass sheet on the platform 1 of the glass sheet receiving means. Both sensors 30 and 31 may include auxiliary sensors 30' and 31'; data processor means 33 receiving the signals from sensors 30 and 31 and process them to trigger the actuation of the fluid operated motor 20, so that when the piston 22 is actuated, the piston lifts the hinged angular arm 10 with the plate 1 carrying a glass sheet GS thereon, from a horizontal position to a vertical position at an angle enough to be placed on a pyramidal conveying shelf PS to be carried away. A third sensor 32 provides a signal representative of the end running of the piston 22, to be processed by the data processor means 33 to initiate a new discharging operation.

The placing of the glass sheet on the cushioning pad CE of the pyramidal conveying shelf PS, can be a manual operation or an automatic operation, therefor, a switch selector 34 can be provided at the data processor means 33, to select an automatic operation, manual operation or out-of-service mode selection.

Figure 2:
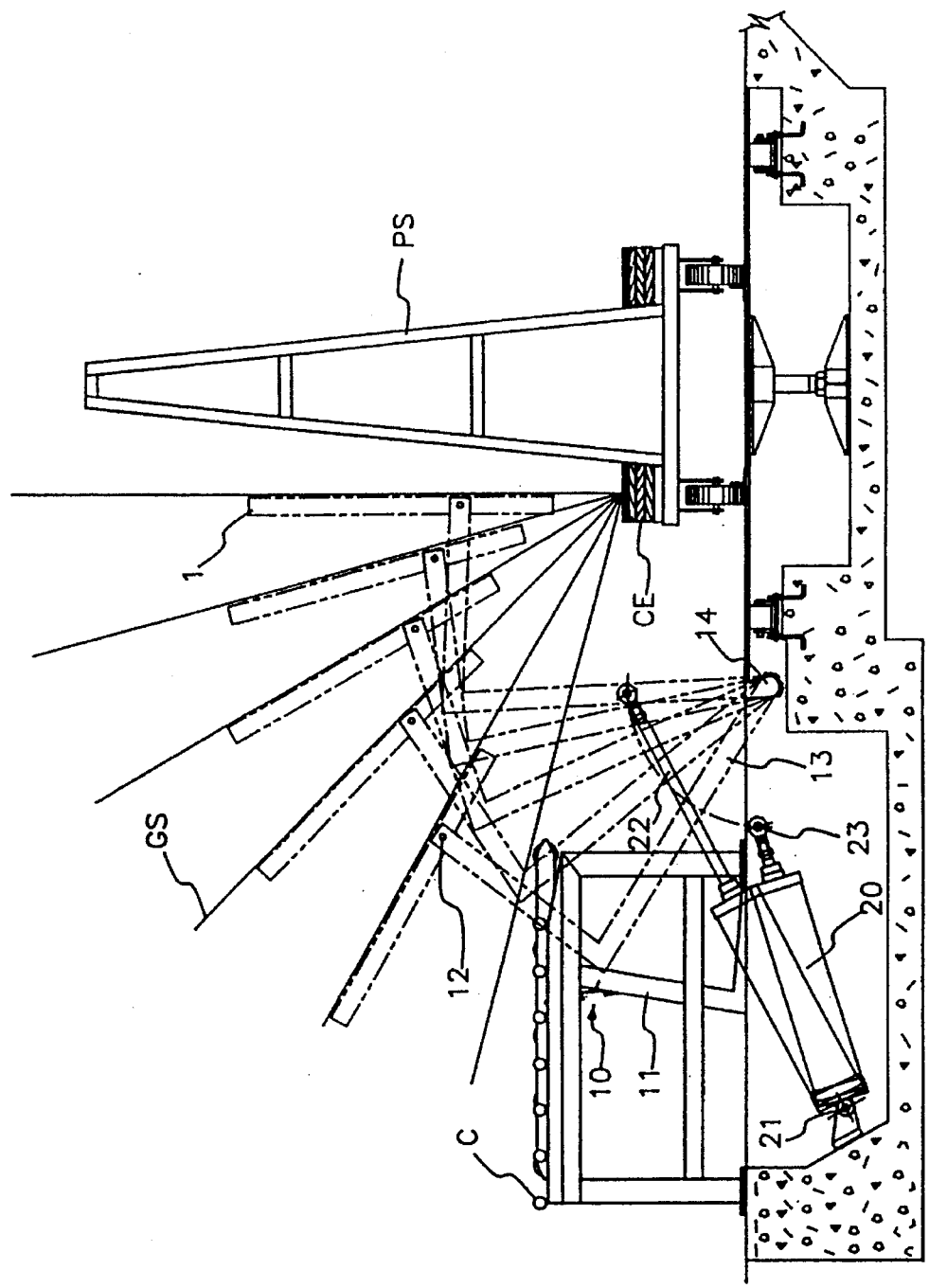

In the embodiment formerly disclosed and illustrated in FIGS. 1 and 2, the glass sheet receiving means have been described and illustrated as a platform 1, however, it is to be understood that such glass sheet receiving means can be any other component which is able to receive and support a glass sheet thereon.

Preferably, as illustrated in FIG. 2A of the drawings, the platform 1 is inserted as an intermediate part of the conveyor C comprised by two frame members 2, 2' having a plurality of transversal bars 3 each including a plurality of rollers 4 to slide rolling against the glass sheet GS when it is been charged on the conveyor shelf PS.

Another embodiment for said platform 1, may comprise a width similar to the conveyor C and placed at the end thereof, and may include an end (not shown) sloped downstream at an angle to allow sliding of the glass sheet and mount it on the pad CE of the shelf PS.

Similarly, the hinged angular member 10 can be a curved arm or any other linkage component able to lift the glass sheet receiving means with a glass sheet thereon, from a horizontal position, to a vertical position at an angle enough to be safely loaded on the pyramidal shelf.

Preferably, it is comprised of two angular arms 10A 10B which may be connected by a cross bar to be actuated simultaneously, each of which includes its support member 11A, 11B having its free end 12A and 12B coupled to a respective frame members 2,2' and its operating member 13A, 13B at 90° regarding the support member 11A, 11B, having its free ends pivotally coupled to a support structure SE.

Also, preferably each of the free ends 12A and 12B of the angular arms 10A and 10B are pivotally coupled to the frame members 2,2' and may include a spring S or reciprocating element, to allow the platform 1 to be totally and continuously in contact with the glass sheet GS.

The specific type of the driving means can also depend on the specific reciprocate lifting means used to lift the glass sheet receiving means with the glass sheet thereon, as a way of example, the driving means could be a single or a double fluid operated motor, or a rotary motor actuating a pinion and rack assembly to lift the hinged angular member.

Consequently, it must be understood that the invention is not limited to the specific embodiments disclosed above and that the persons having ordinary skill in the art could suggest other specific combinations of components which will be within the inventive concept herein disclosed.

What is claimed is:

1. A glass sheet handling apparatus to horizontally receive a glass sheet from a production line conveyor and place it vertically on an adjacent conveyance shelf, the apparatus comprising:
   (a) a glass sheet receiving platform at a discharging end of the conveyor comprising at least two lateral frame members and a plurality of transverse bars connecting said lateral frame members, each of the transverse bars including rollers, to horizontally receive and move the glass sheet across the platform for discharge from the production line;
   (b) at least two reciprocating angular members, each having a first end pivotally joined to opposite sides of the platform and a second fixed end anchored to a base, and an operating member contacting said angular member between said first free end and said second fixed end to rotate the platform with the glass sheet thereon from a first horizontal position in contact with the conveyance shelf to a second vertical position in contact with the conveyance shelf;
   (c) driving means coupled to the operating member; and
   (d) control means comprising a sensor to provide a signal indicating the presence of a glass sheet on the platform, and a data processor for receiving and processing the signal to activate the driving means.

2. The glass sheet handling apparatus according to claim 1, wherein the platform is inserted as an intermediate part of the conveyor.

3. The glass sheet handling apparatus according to claim 1, wherein the platform has a width similar to a width of the conveyor and is placed at an end thereof, and includes an end sloped downstream at an angle to allow sliding of the glass sheet to mount it on the shelf of the conveyance.

4. The glass sheet handling apparatus according to claim 1, wherein each of free ends of the angular arms include a spring to allow the platform to be totally and continuously in contact with the glass sheet.

5. The glass sheeting handling apparatus according to claim 1, wherein the driving means comprises pressurized hydraulic fluid and the operating member comprises a fluid operated cylinder and piston assembly having the cylinder pivotally anchored to a support structure and having an end of its piston pivotally coupled to an intermediate portion of the angular member, so that when the piston is actuated, it lifts the platform carrying the glass sheet thereon from the horizontal position to the vertical position.

6. The glass sheet handling apparatus according to claim 1, wherein the driving means comprises a rotary electric motor and the operating member is a pinion and rack assembly for lifting the platform carrying the glass sheet thereon.

7. The glass sheet handling apparatus of claim 1, wherein the control means comprises a selector switch to select an automatic operation, manual operation or out-of-service mode.

* * * * *